United States Patent [19]

Clement et al.

[11] Patent Number: 4,925,469

[45] Date of Patent: May 15, 1990

[54] AIR FILTER FOR HEAT ENGINES

[75] Inventors: Pierre Clement, Pont-de-Roide; Thierry Gourlot, Seloncourt, both of France

[73] Assignee: ECIA-Equipments Et Composants Pour L'Industrie Automobile, Audincourt, France

[21] Appl. No.: 326,767

[22] Filed: Mar. 21, 1989

[30] Foreign Application Priority Data

Mar. 22, 1988 [FR] France .................. 88 03729

[51] Int. Cl.[5] ............................................. B01D 46/52
[52] U.S. Cl. ........................................ 55/480; 55/481; 55/493; 55/497; 55/502; 55/503
[58] Field of Search ................. 55/480, 481, 493, 497, 55/501–504, 510, DIG. 31

[56] References Cited

U.S. PATENT DOCUMENTS

| | | | |
|---|---|---|---|
| 3,494,113 | 2/1970 | Kinney | 55/481 |
| 3,793,813 | 2/1974 | McAllister | 55/481 |
| 3,815,754 | 6/1974 | Rosenberg | 55/497 X |
| 3,976,457 | 8/1976 | Martin | 55/504 X |
| 4,018,580 | 4/1977 | Burkholz et al. | 55/481 X |
| 4,440,555 | 4/1984 | Chichester | 55/480 X |

Primary Examiner—Charles Hart
Attorney, Agent, or Firm—Sughrue, Mion, Zinn, Macpeak & Seas

[57] ABSTRACT

The filter comprises a body (10) defining a chamber (101) to which access is had through an opening (102) closed by a cover (103). The chamber is adapted to receive a filtering cartridge (20). The body (10) is made in two semi-shells (110, 120) which are united in a junction plane (100) extending across the chamber (101), the opening (102) for the passage of the filtering cartridge (20) being astride the junction plane (100). A positioning device (30) for the filtering cartridge is carried by the body (10) to permit the insertion or the removal of the cartridge (20) by a movement in translation in a direction substantially parallel to the junction plane (100) and the positioning and the retraction of the cartridge by a displacement in a direction substantially perpendicular to the junction plane (100). Application in automotive vehicle engines.

21 Claims, 2 Drawing Sheets

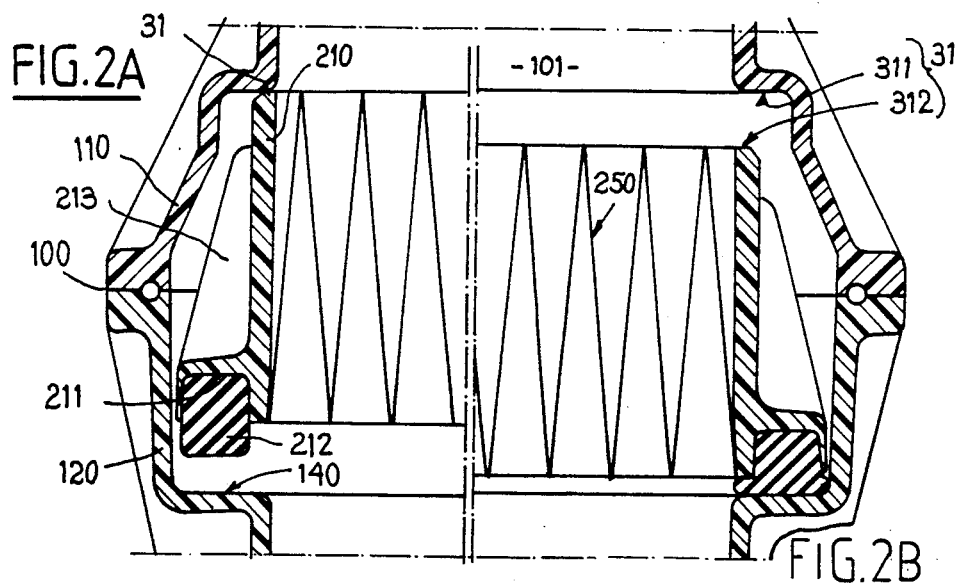
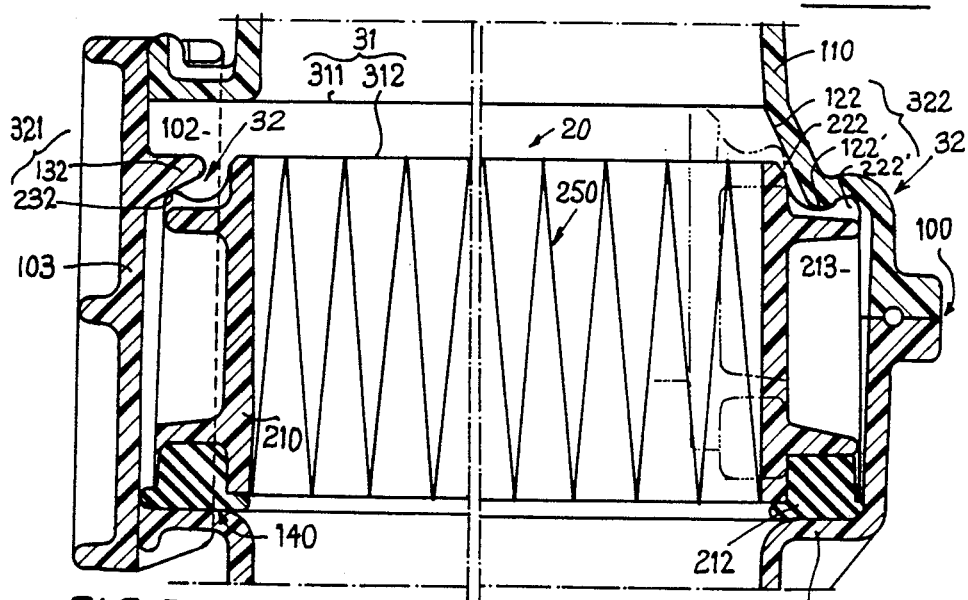
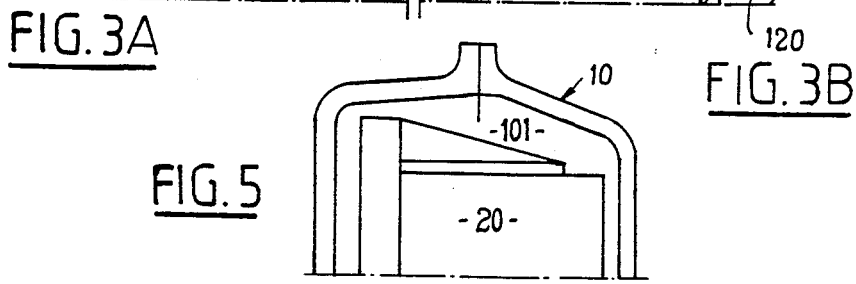

AIR FILTER FOR HEAT ENGINES

BACKGROUND OF THE INVENTION

The present invention relates to filters and more particularly air filters employed in association with heat engines such as explosion engines for a motor vehicle.

As is conventional for the feeding of heat engines such as automobile engines employing essentially air as a comburent which is mixed with a fuel such as volatilized petrol or gasoline, the air is filtered in such a manner as to remove foreign particles which are in particular abrasive and liable to damage by scratching within time in particular the pistons and cylinders.

The air filters for this type of engine are well known in the art.

As an illustration, there will be mentioned the European patent application EP 0 152,513. The air filter described in this document comprises a cylindrical body, closed by a detachable cover, in the chamber of which there is placed in a detachable manner a filtering cartridge which may be cleaned and changed when it is clogged. The filtering cartridge is in the form of an annular assembly disposed in the chamber of the body of the filter. This filter body is provided with a tangential inlet nozzle and an axial central outlet nozzle. As is explained in this document, the cover which closes the chamber of the body is maintained in position by means of a nut having lugs or a wing nut and a washer, both of which are mounted on a screw-threaded rod.

Air filters, which are remarkably well illustrated in this document, are such that, for the purpose of proceeding to the cleaning or the exchanging of the filtering cartridge, it is first of all necessary to unscrew the screws or nuts which maintain the cover on the chamber of the body and then remove the cover before being able to reach the filtering cartridge and the sealing element between the body and the cover for dismantling the cartridge. When the filtering cartridge been cleaned or replaced by a new cartridge and the latter has been placed in the chamber, the sealing element and cover must be put back and the cover must be fixed in position by putting back the nut and washer which must then be tightened.

All these operations must be carried out with a certain strictness. In particular, the sealing element or elements must be correctly placed in position and if necessary replaced. Indeed, if this is not done or badly done, a reduction in the performance of the engine or even a shortening of its life may be observed.

It will be understood that such operations require specialized personnel and tooling and that they are subject to error when placing the parts back in position, or elements may be lost, for example the washers and screws or nuts might escape and drop into the outlet nozzle. These elements are then liable to obstruct the carburetor and even damage the engine itself if they manage to reach the engine.

SUMMARY OF THE INVENTION

An object of the invention is to overcome this type of drawbacks so that an operator having no special knowledge and no special tooling may proceed to a cleaning or a replacement of the filtering cartridge in a rapid and reliable manner.

The whole interest of the invention will therefore be understood since it offers more convenience than the air filters of the prior art.

An object of the invention is to provide an improved air filter for a heat engine, and more particularly for an automotive vehicle engine, which has such construction that access to the filtering cartridge may be easily had without tooling and without any risk of error.

The air filter according to the invention, which is of simple design, is easy to use and of a relatively cheap construction and moreover has a large filtering area, which improves the efficiency of the heat engine. Furthermore, the configuration of this filter is such that its body and its filtering cartridge are so combined as to allow a simple and correct mounting of the assembly with no risk of error.

The invention provides an air filter in particular for a heat engine, comprising a body defining an inner chamber to which access is had through an opening closed by a movable cover and onto which open an inlet nozzle for the admission of the gas to be filtered and an outlet nozzle for discharging the filtered gas and which is adapted to receive an interchangeable filtering cartridge made from a chassis-frame with a filter proper. This air filter is characterized in that the body is made from two semi-shells interconnected in a junction plane extending across the chamber, the opening for introducing the cartridge is located astride the junction plane and positioning means are carried by the body in such a manner as to permit the insertion or the removal of the cartridge by translation in a direction substantially parallel to the junction plane and its positioning or its withdrawal by a displacement in a direction substantially perpendicular to said junction plane.

Further features of the invention will be apparent from the following description and claims with reference to the accompanying drawings which are given solely by way of example and in which:

BRIEF DESCRIPTION OF THE DRAWINGS

FIGS. 2A and 2B are partial cross-sectional views of FIG. 1 taken in plane II—II in which the left semi-view represents the cartridge inserted but before it is placed in position and the right semi-view represents the cartridge inserted and placed in position;

FIG. 3 is a partial longitudinal sectional view taken in a plane perpendicular to the junction plane, showing the cartridge inserted and placed in position in full lines and in the course of being placed in position in dot-dash lines;

FIG. 5 is a partial diagrammatic front elevational view with the opening open and the chamber provided with a cartridge showing the special configuration providing foolproof means.

DETAILED DESCRIPTION OF PREFERRED EMBODIMENT

Figure 1:
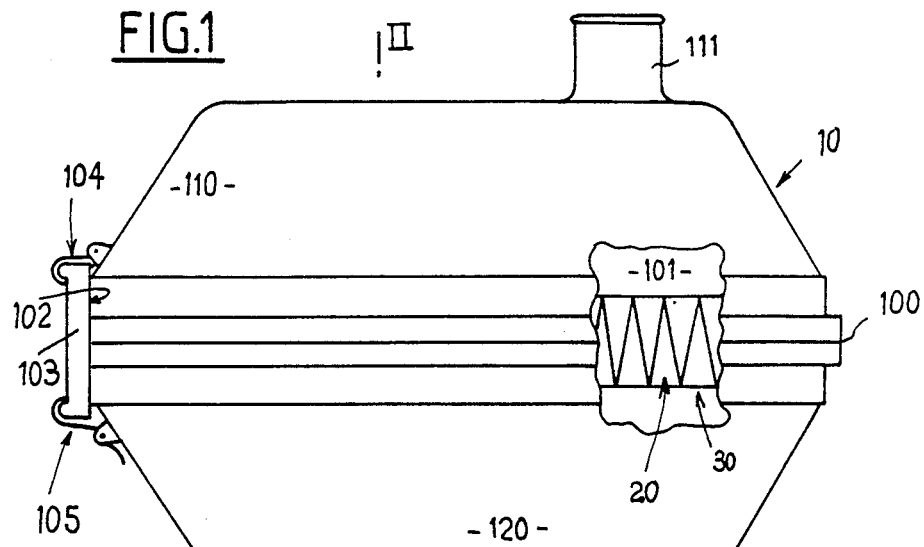
FIG. 1 is a diagrammatic outside view with a part cut away of an embodiment of an air filter according to the invention.

As air filters for automobile engines are well known in the art, only that which directly concerns the invention will be described hereinafter. For the rest, one skilled in the considered art will be able to deduce from the conventional arrangements available to him solutions to particular problems with which he is confronted.

In the following description, the same reference numerals will always be used for designating a similiar element whatever the embodiment in which it is shown.

As can seen in particular in FIG. 1, an air filter according to the invention comprises a body 10 in which is placed an interchangeable filtering cartridge 20 with the aid of positioning means 30.

As can be seen, the body 10 is made from two semi-shells 110 and 120 which are interconnected in an substantially median junction plane 100 so as to define an inner chamber 101. An inlet nozzle 111 and an outlet nozzle 121 open onto this chamber 101.

As can be seen, these two nozzles are substantially disposed to be perpendicular to the junction plane 100 and located substantially symmetrically relative to an axis of the latter which is normal to the plane of the FIGURE. But these nozzles may also occupy a different position chosen in accordance with the requirements of placement in the engine compartment of the vehicle.

Access is had to the chamber 101 through an opening 102 disposed astride the junction plane 100. This opening 102 is closed by a movable cover 103 which is detachable or articulated to the body.

In the embodiment illustrated in FIG. 1, the cover 103 is articulated to one of the semi-shells of the body 100 by one or more hinges 104. This cover is maintained in the closed position by a fastener 105, for example in the conventional form of one or more resilient strips shaped in a suitable manner.

Figure 4A:
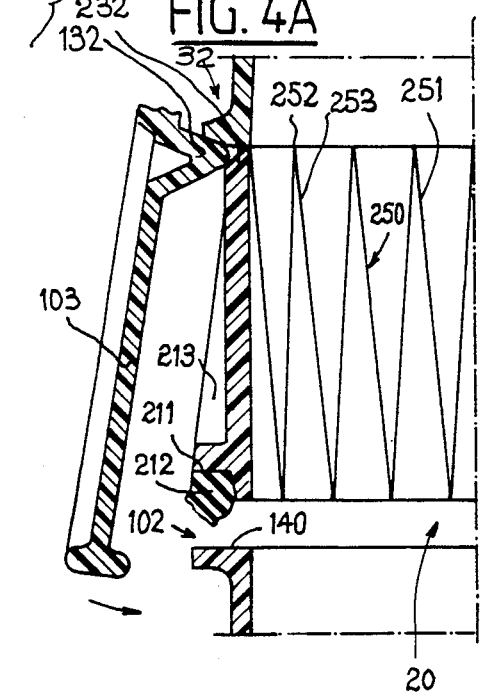
FIG. 4 is a view similar to FIG. 3 of another embodiment in which the left semi-view of FIG. 4A represents the cartridge inserted before it is placed in position and the right semi-view of FIG. 4B represents the cartridge inserted and placed in position.
Figure 4B:
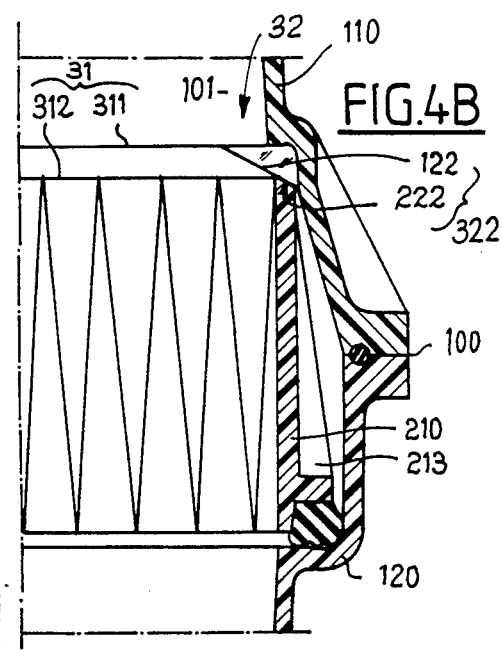

In FIGS. 3 and 4 other embodiments of the cover are shown without illustrating the particular assemblies or fasteners thereof; many solutions are possible and a person skilled in the art will choose those which are the most suitable for the adopted embodiment.

The filtering cartridge 20 comprises a chassis-frame 210 which is in the form of a bottom-less parallel-sided box open on two of its opposed sides. One of the peripheries of one of the sides is provided with a peripheral recess 211 such as a groove for receiving a sealing element 212 whose function will be explained hereinafter. If necessary, this chassis-frame 210 is provided with stiffening ribs 213.

Disposed in the chassis-frame 210 in a suitable manner is a filter 250 proper. This filter 250 is constituted by a porous medium, for example a multiplayer sheet 250 which is folded into an accordion in such a manner that the edges 252 of the folds 253 are substantially parallel to the junction plane 100.

The filtering cartridge may also be of any other commercially available type, for example that usually named "Pocket" in which the filter 250 is self-supporting and also performs the function of the chassis-frame.

The positioning means 30 comprise slideways 31 and a locking device 32.

The slideways 31 are oriented in a direction parallel to the junction plane 100 so as to permit a translation of the filtering cartridge 20 in a direction substantially parallel to this plane in the manner of a drawer, as will be understood hereinafter. These slideways are formed by cooperating supports, some of which, 311, are disposed on the body 10 and others, 312, on the chassis-frame 210. These rectilinear supports of any suitable type, for example having complementary planar and curved sections, cooperate in the manner of those of a drawer to permit a sliding in a direction substantially parallel to the junction plane 100 while also providing a guiding of the cartridge for the insertion or the removal of the latter.

The locking device 32 is adapted to impart to the filtering cartridge 20, a displacement which is substantially perpendicular to the junction plane 100, as will be understood hereinafter, to position the cartridge under pressure. This locking device 32 comprises a group 321 which permits causing the cover 103 to cooperate with the chassis-frame 210 and another group 322 which causes the body 10 to cooperate with the chassis-frame 210.

As can be seen in the various Figures, the group 321 comprises at least one wedge 132 or the like carried by the cover 103 and a bevel 232 or the like, provided on that one of the peripheries of the chassis-frame 210 which is opposite to the sealing element 212. The group 322 is so arranged as to act as a cam and, possibly, also as an articulation. When the group 322 acts as a cam, it comprises complementary ramps which cooperate with each other when they come in contact, some of the ramps 122 being disposed on the body 10 whereas the other ramps 222 are disposed on the chassis-frame 210.

When the group 322 also acts as an articulation, it further comprises complementary projections which cooperate when they come in contact, some of the projections 122' being associated with the body 10 whereas the other projections 222' are associated with the chassis-frame 210.

A description will now be given of how the filtering cartridge is engaged and placed in position in the body of the filter according to the invention.

Preferably, the filtering cartridge is provided with suitable single or double fool-proof means so that it is possible to present it only in front of the body in the inserting position with a single orientation which precludes an incorrect disposition in the antero-posterior longitudinal direction or in the recto-verso transverse direction; another error being impossible since the filtering cartridge has a chassis-frame having a rectangular and not a square parallel-sided configuration. In the embodiment shown in FIGS. 3 and 4, only a single recto-verso fool-proof means is necessary since, as can be seen, the antero-posterior ends of the chassis-frame 210 are identical. The recto-verso fool-proof means results for example from the substantially trapezoidal configuration given to the cross-section, as shown in the partial view of FIG. 5.

The fastener 105 of the cover 103 is opened and the latter is displaced. As the opening 102 is now cleared, access may be had to the chamber 101.

With the filtering cartridge presenting its chassis-frame 210 in the correct orientation, it is inserted in the opening 102.

The supports 311 and 312 of the body 10 and chassis-frame 210 then come in contact and enable the chassis-frame to slide correctly in the manner of a drawer in a direction substantially parallel to the junction plane 100. When the chassis-frame is almost completely engaged, just before the locking device 32 comes into action, it occupies the positions illustrated in FIGS. 2A, 3 (in dot-dash lines) and 4A.

As can be seen in FIG. 3, the ramps 122 and 222 then come in contact and are applied one against the other. When the cover 103 is then closed (arrow shown in FIG. 4A), its wedge 132 comes to bear against the bevel 232 of the chassis-frame 210 which it first of all urges in the inward direction and then urges in a direction perpendicular to the direction of the joint plane, or inversely. In so doing, a force is exerted which causes, on one hand, the ramps 122, 222 to slide against each other, and on the other hand, the wedge and the bevel 132, 232 to slide against each other and compress the sealing element 212 against its seat 140. The fastener 105 can now be locked. The position of the chassis-frame in the chamber is then that shown in FIGS. 2B, 3 and 4B.

The sealing element affords the seal but also an elastically yieldable immobilization of the chassis-frame in the chamber.

Thus it can be seen that the filtering cartridge 20 first of all moves substantially in a direction parallel to the junction plane 100 and then moves substantially perpendicular to the latter. As the sealing element 212 is applied against its seat 140, the seal is correctly achieved.

As can be seen, in the embodiment shown in FIGS. 3 and 4, the ramps 220 and the bevel 232 are interchangeable.

With reference now to the embodiment shown in FIG. 3, it can be seen that the group 322 of the locking device 32 includes in addition complementary projections 122' and 222'. When the chassis-frame 210 of the filtering cartridge is in the vicinity of the end of its travel, the ramps 122, 222 come in contact as shown in dot-dash lines and cause the chassis-frame to move in such a manner as to apply the sealing element 212 against its seat 140. By urging the chassis-frame still further inwardly, the projections 122', 222' interengage and grip against each other as illustrated in full lines. When the cover 103 is closed as described hereinbefore, the wedge 132 once again encounters the bevel 232 and causes the chassis-frame 210 to pivot about the projections which act as an articulation and causes the sealing element 212 to be correctly applied against its seat 140.

To disengage the filtering cartridge 20 from the body 10, the procedure is the opposite to that described. However, note that, in respect of the embodiment shown in FIG. 3, when the cover 103 is opened, a pull must be exerted to overcome the resistance to the separation of the interengaged projections which are held in this position by the compressed elastically yieldable sealing element 212. The semi-shells 110 and 120 of the body 10 are for example obtained by a moulding of a suitable synthetic material which may be if desired reinforced by fibres or a suitable filler.

The chassis-frame 210 of the cartridge 20 is also manufactured if desired by moulding in the manner indicated for the semi-shells of the body.

The sealing element 212 is made for example from a suitable elastomer which is if required adhered to or otherwise fixed to its cavity 211.

The filter 250 proper is constituted for example by a multilayer sheet of a for example non-woven material, such as those obtained from fibres of synthetic materials arranged in the manner of a felt.

For the purpose of folding such a sheet in the form of an accordion, weakening lines or lines of less resistance are provided, for example by crushing, pressing or cutting or by means of a hot wire or by ultrasound marking in the regions where the edges 252 of the folds 253 must be formed.

Such a sheet or band with the lines 252 is then engaged in a tunnel or the like and is for example subjected to a pressure by jet of compressed air so that it is folded into an accordion along the weak lines resulting from the weakenings 253. Such a configuration is shown in the Figures of the drawing. This filter in the shape of an accordion is then fixed on the chassis-frame 210 by any suitable method, such as adhesion, welding, forming-over or moulding.

In a modification, the filtering cartridge 20 comprises a recoverable chassis-frame 210 in which a dispensable detachable filter 250 is placed in position, this filter being disposed of after use. In such a case, it is this detachable and dispensable filter 250 which is directly moulded onto a flexible sealing element 212 of suitable configuration and type permitting a simple and correct mounting on the chassis-frame 210 which is no longer disposed of but retained. This solution, which still permits the use of unspecialized personnel, is still more advantageous from the economical point of view, since only the filter 250 proper is replaced.

It will also be observed that, whatever solution is chosen, namely a disposable chassis-frame 210 or a recoverable chassis-frame 210, the latter may be arranged in such a manner as to incorporate also the cover 103 which is in this case no longer associated with the body 10.

The whole interest of the air filter, in particular for automobile heat engines according to the invention, will therefore be understood, since it permits proceeding to the positioning or the extraction of the detachable filtering cartridge in a simple manner without requiring any tool. Furthermore, when the cover for the opening allowing access to the chamber is maintained in a manner preventing it from being lost connected to the body or otherwise associated with the chassis-frame, there is no risk of screws, nuts, washers or other assembly accessories becoming lost. It will therefore be understood that the replacement or the exchange of a filtering cartridge can be effected without the aid of any tool, without the use of any highly-qualified personnel and without any risk of error or accident.

What is claimed is:

1. An air filter for a heat engine, said filter comprising a non-cylindrical body defining a chamber, an opening in the body providing access to the chamber, a cover for closing the opening, an inlet nozzle for admission of the gas to be filtered opening onto the chamber, an outlet nozzle for discharge of the filtered gas opening onto the chamber, an interchangeabile filtering cartridge comprising a chassis-frame and a filter proper, the filtering cartridge being capable of being introduced in the chamber and remove from the chamber through said opening, the body comprising two semi-shells united in a junction plane extending across the chamber, said opening being astride the junction plane, and positioning means for placing the filtering cartridge in position and being carried by the body in such a manner as to permit selectively the introduction and the removal of the cartridge by a movement in translation of the cartridge in a direction substantially parallel to the junction plane and a positioning and a retraction of the cartridge by a displacement of the cartridge in a direction substantially perpendicular to said junction plane, said positioning means causing the translation to occur first, before the displacement, when said cartridge is inserted into said body, and conversely when said cartridge is withdrawn.

2. An air filter according to claim 1, wherein each of the semi-shells carries one of the nozzles.

3. An air filter according to claim 1, wherein at least one of the nozzles is substantially perpendicular to said junction plane.

4. An air filter according to claim 1, wherein the cover is mounted on the body to be movable but not detachable.

5. An air filter according to claim 4, comprising hinge means for combining the cover with the body and a fastener for holding the cover in a position for closing said opening on the body.

6. An air filter according to claim 1, wherein the cover is carried by the chassis-frame.

7. An air filter according to claim 1, wherein the positioning means comprise slideways for guiding said movement in translation in a direction substantially parallel to said junction plane and a locking device for causing said displacement in a direction substantially perpendicular to said junction plane.

8. An air filter according to claim 7, wherein said slideways comprise complementary supports some of which are carried by the body whereas other supports are carried by at least one of the semi-shells.

9. An air filter according to claim 7, wherein the locking device comprises a first group for causing the cover and the chassis-frame to cooperate and a second group for causing the body and the chassis-frame to cooperate.

10. An air filter according to claim 9, wherein said first group comprises at least one wedge carried by the cover and a bevel carried by the chassis-frame.

11. An air filter according to claim 9, wherein said second group comprises cams including ramps some of which ramps are carried by the body whereas other ramps are carried by the chassis-frame.

12. An air filter according to claim 9, wherein said second group comprises interengageable projections constituting an articulation, some of which projections are carried by the body whereas other projections are carried by the chassis-frame.

13. An air filter according to claim 1, wherein the body includes a sealing element seat substantially parallel to said junction plane.

14. An air filter according to claim 1, wherein the chassis-frame is in the form of a bottom-less generally parallel-sided box having a periphery adapted to receive a sealing element on one of the sides thereof.

15. An air filter according to claim 14, wherein said periphery is provided with a recess for the sealing element.

16. An air filter according to claim 10, wherein a periphery of said box which is opposed to said periphery adapted to receive the sealing element is provided with said bevel and ramps.

17. An air filter according to claim 1, wherein the chassis-frame has identical antero-posterior ends.

18. An air filter according to claim 1, wherein the body and the chassis-frame have cross-sections having substantially trapezoidal complementary contours.

19. An air filter according to claim 1, wherein the filter is made from a sheet or band folded into an accordion having folds which have edges substantially parallel to said junction plane.

20. An air filter according to claim 1, wherein the filter is detachably disposed in the chassis-frame.

21. An air filter according to claim 1, wherein the filter carries said sealing element.

* * * * *